3,632,655
PROCESS FOR PREPARING
PARAFORMALDEHYDE
Teo Paleologo and Jacob Ackermann, Milan, Italy, assignors to Società Italiana Resine S.p.A., Milan, Italy
No Drawing. Filed July 9, 1968, Ser. No. 743,273
Claims priority, application Italy, July 17, 1967, 18,473/67
Int. Cl. C07c 47/10
U.S. Cl. 260—615.5     3 Claims

ABSTRACT OF THE DISCLOSURE

A process for the preparation of particulate soluble paraformaldehyde is provided in which particulate material is formed from solution and cured in the presence adsorbed on the particle surfaces of a catalyst comprising at least one basic organic compound of a $pK_b$ between 2 and 6, optionally in admixture with at least one other such compound of a $pK_b$ between 6 and 12.

---

The invention relates to the preparation of soluble particulate paraformaldehyde.

Paraformaldehyde contains mixtures of polymers of formaldehyde of variable molecular weight and is stable towards commercial aqueous formaldehyde solutions of high formaldehyde content, which makes it suitable for storage and economically convenient to transport.

Paraformaldehyde is a high-concentration source of monomeric formaldehyde, which may be used, for instance, for the manufacture of thermosetting resins, such as phenol and melamine resins, or thermoplastic resins with essentially a formaldehyde base (polyacetal polymers and copolymers).

For use, paraformaldehyde may be dissolved in water or alcohol, in which it depolymerizes and forms solutions of any desired concentration.

For the paraformaldehyde to be commercially useful its polymerization degree should not be low, for products of low melting point and semi-solid character are difficult to handle, nor should it be high, for products of high melting point are degradable only with difficulty and not very soluble. Moreover, the product should be in the form of discrete non-packing particles to avoid difficulty in preparation of solutions for use.

Commercial paraformaldehyde usually titrates over 90%, commonly over 95%, as it has undergone heat treatments designed to give a product in the form of flake, powder or other solid form not tending to pack. However, as a result of the heat treatments the polymerization degree of the paraformaldehyde is undesirably raised.

Even where the formaldehyde content is not very high, so that the average molecular weight is relatively low, the paraformaldehyde obtained by conventional processes still contains a considerable percentage of product of high molecular weight which is almost water-insoluble and has a low reactivity.

Moreover, the trade requires ash-free formaldehyde, of low impurity content; its aqueous solutions should further be of a pH between 2.8 and 5.5, that is, they should not differ from commercial Formalin solutions.

Paraformaldehyde can be prepared by a two-step process comprising a preliminary concentration of commercial aqueous Formalin in a liquid phase, using for example conventional concentration-evaporation equipment, followed by solidification of the mass in a further reactor provided with powerful stirrers, the reactor also acting as a concentrator.

Solidification of the product therefore occurs during concentration and water is further evaporated during and after solidification.

Obviously, the heat exchange coefficient in a plastic or solid mass is very low, so that not only does the concentration proceed very slowly (taking usually 4 to 6 hours), but the product is unevenly heated. Non-uniformity of the temperature results in a high degradation of the product, which results in low yields and is probably the cause for an unrestricted distribution of the molecular weights.

Acid catalysts, such as sulphuric acid, or basic catalysts such as sodium hydrate or potassium carbonate can be used in order to accelerate precipitation and solidification of paraformaldehyde. The use of these catalysts, however, has drawbacks, for the catalysts remain in the final product, which is therefore of excessively high ash-content. Moreover, with basic catalysts the alkali causes the pH to rise and undesirable side reactions, such as the Cannizzaro reaction or the formation of yellow-brown coloured sugars, to occur.

It is an object of the invention to provide a process in which the above drawbacks may be mitigated or avoided and highly soluble paraformaldehyde be prepared, with controlled molecular weight values and in the form of discrete particles which do not tend to pack.

According to the process of the invention commercial formalin is concentrated to obtain a composition titrating about 75 to 93% formaldehyde, and the liquid formalin is thereupon rapidly cooled and concentrated till solidification occurs in the form of discrete particles. The solid particles are then cured while having adsorbed on their surface small quantities of a catalyst comprising one or a plurality of organic compounds of a basic nature, which are defined hereafter.

Aqueous formaldehyde solutions of concentrations exceeding about 75%, suitable for conversion to paraformaldehyde by the process of the invention, may be obtained in a number of ways; however, in the preferred embodiment of the invention a process is employed, which is described in a co-pending Italian application No. 14036/67 (now Pat. No. 791,442) and is characterized by carrying out the concentration of the aqueous formaldehyde solutions at a temperature below the stabilizing point of the desired concentrated aqueous solution, the concentration being carried out in two or more steps over a period shorter than required for the solidification and/or appearance of solid bodies in the mass, and a curing period being interposed between the concentration steps at a temperature exceeding the stability point.

Cooling of the concentrated formalin may be carried out, in the preferred embodiment, by utilizing a process described in another pending Italian patent application No. 14037/67 (now Pat. No. 791,443) characterized by cooling an aqueous Formalin solution titrating between 75 and 96%, to effect solidification ni the form of discrete subdivided particles, at a temperature equalling or slightly exceeding room temperature.

In operation Formalin titrating approximately 75% or over is fed to sprayers, pulverizers, atomizers or prilling towers in which the product is cooled by admission of air or other inert gas at a temperature ranging between —20 and 60° C., preferably between 0° and 40° C.

Adsorption of the catalyst, the nature of which is described below, on the surface of the product in course of solidification is preferably obtained by distributing the catalyst, which may be solubilized in water or formalin, by means of an atomizer within the solidification chamber, such as in the prilling tower; alternatively, a fraction of the cooling gas is conveyed to the solidification chamber, this fraction being saturated with the catalytic compound.

The solid product, in the form of granules or powder containing at its surface the adsorbed catalyst, is collected, for example on a conveyor belt, and kept at a temperature lower by 10 to 20° C. than its softening point for a period preferably ranging between 2 and 50 minutes, this period being sufficient to give a product which can be handled.

Organic compounds of a basic nature, useful as catalysts for the purposes of the invention, are compounds of a $pK_b$ between 2 and 6, mostly amines such as methylamine, trimethylamine, triethylamine, tributylamine, ethylendiamine or piperidine and 1,4-diazobicyclo-(2,2,2)octane, or mixtures of these compounds with basic organic products of a $pK_b$ ranging between 6 and 12, examples of which are pyridine, p-toluidine, phenylhydrazine, hydroxylamine, aniline and trimethyldodecylammonium-hydroxide.

By the process of the invention these compounds deposit on the surface of the subdivided solid and give rise to the formation of particles having a hard skin, which reduces or avoids packing, and a core of a product of relatively low molecular weight, depending more particularly upon the catalyst employed and quantity thereof, and additionally upon the relative quantities of mixed catalysts when the operation is carried out with two or a plurality of substances differing in $pK_b$ value. For the above reasons the said compounds act as regulators of the molecular weight as well as polymerization activators on the surface of the particles.

The quantity of catalyst which may be employed for the purposes of the invention depends on the desired extent of activity as well as upon the quantity of formic acid present in the product; in any case, the quantity may range between 0.001 and 0.5% by weight with respect to paraformaldehyde. It should be noted that the necessary quantity for obtaining the desired effect is usually smaller than would theoretically be required for neutralizing the formic acid in the reacting mixture.

This is a difference over processes which utilize highly basic amines in order to avoid the ash content in paraformaldehyde. In these processes the amines are used in relatively high quantities in order to obtain the desired effect of accelerating solidification and precipitating the polymer, with the objectionable result that products of excessively high molecular weight and melting point are obtained, the pH values of the paraformaldehyde being likewise too high.

In addition to the abovementioned advantages the curing rate using the process of the invention is much higher than it would be otherwise, a paraformaldehyde being produced, the formaldehyde content of which is substantially unaltered with respect to the concentrated compositions which are solidified.

In one embodiment of the invention the water which was present at the beginning of the curing process in a form chemically bound to the polymeric chains and which is gradually separated during the curing period, is not removed, and simply remains absorbed by the solid.

However, it is also possible to increase the formaldehyde content by treatment of paraformaldehyde after curing at a relatively low temperature, in any case below the softening point of the product, so as to obtain paraformaldehyde finally titrating between 92 and 99% without, however, appreciably affecting the values of the molecular weight.

For carrying out this treatment hot air driers, or hot tray driers are useful, provided a vacuum is maintained. It is an inherent property of this process that the quantity of formaldehyde evaporating during drying is extremely low and is lower than in known processes, in which polymerization and concentration are carried out simultaneously, in some cases at high temperature.

The paraformaldehyde obtained by the process of the invention is ash-free, highly water-soluble on account of the relatively low molecular weights and yields, on solution in water, solutions of a pH not exceeding 5, that is, within the range of commercial formalines.

The invention is illustrated by the following examples.

EXAMPLE 1

The apparatus used in this example comprised a prilling chamber provided with a full cone pulverizer at the top, lateral atomizers and a collecting tray at the bottom. The prilling chamber was 4.5 m. high, and the pulverizers gave drops of an average diameter of 0.2 mm.

Concentrated formalin titrating approximately 79%, obtained by a process disclosed by a co-pending Italian application No. 14036/67 (now Pat. No. 791.442), is sprayed from above into the prilling chamber, the catalyst, consisting of an aqueous solution of methylamine, being fed laterally through the atomizers. The quantity of catalyst amounted to about 0.01% with respect to the concentrated formaldehyde solution.

After cooling in the prilling chamber the solid product was collected in the bottom tray, in which it was allowed to cure for about 40 minutes. At the end of the curing period the product was flowable and did not tend to pack.

Table 1 summarizes the characteristics of the product determined at various times from the start of the curing period.

TABLE 1

| Time (hours) | 0.1 | 0.2 | 1 | 5 | 20 |
|---|---|---|---|---|---|
| Melting point, °C | 90–95 | 110–130 | 120–135 | 120–135 | 120–135 |
| Titre (percent by weight) | 79.5 | | | 80 | 80.5 |
| pH | 4.5 | | | 4.2 | |
| Bound water (percent by weight) | 4.8 | 3.2 | 3.1 | | 3.0 |

The characteristics which were determined included the melting point, measured in a closed test tube by quick heating of the product in order to avoid changes in molecular weight during the test, formaldehyde content; pH of a solution titrating 20% in water at a temperature of 20° C.; and finally bound water in the form of polyoxymethyleneglycols, obtained as a difference between the total water determined by a gas-chromatographic method after decomposition and the free water determined by the Karl Fischer method.

EXAMPLE 2

The process described in Example 1 was employed and different catalysts in a quantity such as to, neutralize theoretically, about 40% of the formic acid contained in the concentrated Formalin used, were selected. The concentrated Formalin, titrating about 85%, was obtained from commercial Formalin titrating 35% and containing 2.5% methanol and 0.01% formic acid.

The products obtained were cured for 40 minutes, and after this period were flowable, maintaining this property on storage in polythene-lined bags.

The products obtained were analyzed to determine their polymerization degree "n" and solubility in water. The polymerization degree "n" may be defined as follows:

$$HO(CH_2O)_nH$$

and is calculated from the bound water content according to the relation

$$n = 0.60 \left( \frac{100 - A}{A} \right)$$

wherein A is the bound water percentage.

The solubility in water represents the percentage by weight of paraformaldehyde which dissolves in water at 100° C. with a water paraformaldehyde ratio of 7 to 3 after 2 minutes contact, followed by cooling at room temperature. The dissolved portion is determined in the filtrate after filtering at 20° C.

Gas-chromatographic analysis further shows that the products actually contain formaldehyde and water only; methanol and further impurities are present only in very low quantities, the error due to the presence, for instance, of hemiformals of methanol being negligible.

Table 2 summaries the results:

TABLE 2

| Catalyst | "n" | Solubiliy, percent by weight |
|---|---|---|
| Pyridin and triethylamine (weight ratio 1.3:1) | 15 | 92 |
| Ethylendiamine | 27 | 90 |

The products fully dissolved in water on extending the heating period, the pH values of the solution being lower than 5.

We claim:

1. A process for preparing highly soluble paraformaldehyde of controlled molecular weight comprising the steps of
   (a) rapidly cooling an aqueous formaldehyde solution having a formaldehyde content of from 75 to 93% by weight to temperatures ranging from −20° to 60° C. which cause said solution to solidify forming discrete solid particles;
   (b) simultaneously spraying a polymerization catalyst in an aqueous solution or in a Formalin solution onto the surfaces of the solid particles formed in the cooling step, said catalyst being applied at a level of from 0.001 to 0.5% by weight, with respect to the particles, and being selected from the group consisting of:
      (1) organic compounds having a basic character selected from the group of methylamine, trimethylamine, triethylamine, tributylamine, ethylenediamine, piperidine, and 1,4-diazobicyclo-2(2,2,2)octane, and
      (3) mixtures of said organic compounds having a basic character and basic organic compounds selected from the group consisting of pyridine, p-toluidine, phenylhydrazine, hydroxylamine, aniline, and trimethyldodecylammonium hydroxide; and
   (c) curing said particles by maintaining said particles at a temperature below their softening point for from to to 50 minutes.

2. The process according to claim 1, characterized in that the quantity of catalyst employed is less than that required for neutralizing any formic acid in the reaction medium.

3. The process according to claim 1, characterized in that the curing of said particles is by maintaining said particles at a temperature of from 10° to 20° C. lower than the softening point of the product.

References Cited

UNITED STATES PATENTS

| | | | |
|---|---|---|---|
| 3,492,357 | 1/1970 | Levy | 260—615.5 |
| 2,092,422 | 9/1937 | Naujoks | 260—615.5 |
| 2,373,777 | 4/1945 | Peterson | 260—615.5 X |
| 2,568,016 | 9/1951 | MacLean et al. | 260—615.5 |
| 2,568,017 | 9/1951 | MacLean et al. | 260—615.5 |
| 2,568,018 | 9/1951 | MacLean et al. | 260—615.5 |
| 2,704,765 | 3/1955 | Smithson | 260—615.5 |
| 2,936,298 | 5/1960 | Hudgin et al. | 260—615.5 UX |
| 3,316,309 | 4/1967 | Mann et al. | 260—615.5 |
| 3,388,172 | 6/1968 | Dakli et al. | 260—615.5 |
| 3,422,070 | 1/1969 | Ishida et al. | 260—615.5 X |
| 3,422,070 | 1/1968 | Ishida et al. | 260—615.5 X |

FOREIGN PATENTS

| | | | |
|---|---|---|---|
| 55,429 | 4/1967 | Germany | 260—615.5 |
| 1,123,107 | 2/1962 | Germany | 260—615.5 |
| 1,127,080 | 4/1962 | Germany | 260—615.5 |

HOWARD T. MARS, Primary Examiner